United States Patent
Yang et al.

(12) 
(10) Patent No.: US 11,645,780 B2
(45) Date of Patent: May 9, 2023

(54) METHOD AND DEVICE FOR COLLECTING IMAGES OF A SCENE FOR GENERATING VIRTUAL REALITY DATA

(71) Applicant: Realsee (Beijing) Technology Co., Ltd., Beijing (CN)

(72) Inventors: Yonglin Yang, Beijing (CN); Yutong Chen, Beijing (CN); Ning Tao, Beijing (CN); Chengfeng Huang, Beijing (CN); Mingyuan Wang, Beijing (CN)

(73) Assignee: Realsee (Beijing) Technology Co., Ltd., Beijing (CN)

(*) Notice: Subject to any disclaimer, the term of this patent is extended or adjusted under 35 U.S.C. 154(b) by 273 days.

(21) Appl. No.: 17/182,211

(22) Filed: Feb. 22, 2021

(65) Prior Publication Data
US 2021/0287399 A1    Sep. 16, 2021

(30) Foreign Application Priority Data

Mar. 16, 2020 (CN) .......................... 202010180024.5
Mar. 27, 2020 (CN) .......................... 202010232065.4

(51) Int. Cl.
*G06T 7/73* (2017.01)
*G06T 19/00* (2011.01)
*H04N 5/232* (2006.01)

(52) U.S. Cl.
CPC .............. *G06T 7/74* (2017.01); *G06T 19/006* (2013.01); *H04N 5/23232* (2013.01); *H04N 5/23238* (2013.01)

(58) Field of Classification Search
CPC .............. G06T 19/006; H04N 5/23232; H04N 5/23238
USPC .......................................................... 382/103
See application file for complete search history.

(56) References Cited

U.S. PATENT DOCUMENTS

| 10,083,568 B2 * | 9/2018 | Kelly .................. G07F 17/3213 |
| 2013/0147908 A1 | 6/2013 | Wei et al. |
| 2014/0028872 A1 * | 1/2014 | Lee .................... H04N 5/23245 348/229.1 |

(Continued)

FOREIGN PATENT DOCUMENTS

| CN | 103167227 A | 6/2013 |
| CN | 103795924 A | 5/2014 |

(Continued)

OTHER PUBLICATIONS

CN Application No. 2020102320654, Search Report, dated Nov. 11, 2020, China.

*Primary Examiner* — Gabriel I Garcia
(74) *Attorney, Agent, or Firm* — Leydig, Voit & Mayer, Ltd.

(57) ABSTRACT

A method for capturing an image of a scene using an imaging device is disclosed herein. The method includes determining a coordinate system with an origin based on an initial position of the imaging device, generating a first condition to control the position of the imaging device in the coordinated system with respect to the origin, generating a second condition to control the orientation of the imaging device, determining a position and an orientation of the imaging device, generating a first prompt message in response to the position of the imaging device satisfying the first condition, and generating a second prompt message in response to the orientation of the imaging device satisfying the second condition.

25 Claims, 9 Drawing Sheets

(56) References Cited

U.S. PATENT DOCUMENTS

2016/0232423 A1\* 8/2016 Zhong .................... G06V 20/56
2017/0150047 A1 5/2017 Jung et al.
2018/0321826 A1\* 11/2018 Bereza .................... G06T 19/20
2019/0318076 A1\* 10/2019 Chun ..................... G06V 20/20

FOREIGN PATENT DOCUMENTS

| CN | 103826103 A | 5/2014 |
| CN | 106331527 A | 1/2017 |
| CN | 109903227 A | 6/2019 |

\* cited by examiner

METHOD AND DEVICE FOR COLLECTING IMAGES OF A SCENE FOR GENERATING VIRTUAL REALITY DATA

CLAIM OF PRIORITY

This application claims the benefits of priorities to Chinese Patent Application No. 202010180024.5, filed Mar. 16, 2020, and Chinese Patent Application No. 202010232065.4, filed Mar. 27, 2020, the entire contents of which are incorporated herein by reference.

TECHNICAL FIELD

The present disclosure relates to the field of virtual reality technology and, more specifically, to collecting images for generating virtual reality data.

BACKGROUND

Three-dimensional (3D) virtual reality (VR) environment provides a simulated experience that is useful in various applications, such as virtual house touring, virtual map, or interior decoration. The 3D VR scene may be generated based on a plurality of images taken by an imaging device, such as a smartphone or a digital camera. For example, a user may hold a smartphone and rotate 360 degrees to take a plurality of images of a scene. The plurality of images are concatenated along a horizontal direction to form a panorama of the scene.

The panorama generated based on the plurality of images contains a large amount of information of the scene, and depth information of the scene may be extracted from the panorama, for example, by applying artificial intelligence algorithms.

Specifically, the position and the orientation of the imaging device may affect the quality of the generated panorama in a significant way. Therefore, it is desired to control the position and the orientation of the imaging device, while the plurality of the images are acquired.

The imaging device may include sensors, such as an accelerometer and a gyroscope, which generate data for calculation of movement and orientation of the imaging device. The accelerometer measures a non-gravitational axis-based linear acceleration of the movement, and the gyroscope uses the gravity to measure a rotational velocity. In addition to controlling the imaging device based on the parameters provided by these sensors, it may be further desired to more precisely control the imaging device in order to improve the quality of the panorama.

Therefore, there is a need for providing solutions for collecting images of a scene to ensure high-quality virtual reality data.

SUMMARY

A method, computer readable medium, system and apparatus are disclosed for controlling an imaging device to collect images of a scene. Parameters including a position and an orientation of the imaging device may be effectively controlled, such that a high-quality panorama may be generated based on the images captured by the imaging device.

According to an embodiment of the present disclosure, a method is described for capturing an image of a scene using an imaging device. The method includes determining a coordinate system with an origin in a three-dimensional (3D) space of the scene based on an initial position of the imaging device; generating a first condition to control the position of the imaging device in the 3D space; generating a second condition to control the orientation of the imaging device; determining a position and an orientation of the imaging device; generating a first prompt message in response to the position of the imaging device satisfying the first condition; and generating a second prompt message in response to the orientation of the imaging device satisfying the second condition.

In some embodiments, the first condition is defined as a spherical region with a first radius in the 3D space. The method further includes displaying the spherical region with the first radius, when the position of the imaging device is out of the spherical region; and hiding the spherical region with the first radius, when the position of the imaging device is in the spherical region.

In some embodiments, the method further includes receiving a request for changing the first radius to a second radius, and adjusting the first radius to the second radius for the spherical region.

In some embodiments, the orientation of the imaging device comprises at least one of a pitch angle, a yaw angle, or a roll angle. Furthermore, the second condition comprises a tolerance range for at least one of the pitch angle, the yaw angle, or the roll angle.

In some embodiments, the method further includes generating a set of first reference points in the 3D space based on the coordinate system and the origin; generating a set of second reference points; generating a third reference point corresponding to an optical center of the imaging device; and capturing the image, when the third reference point, the second reference point and the corresponding first reference point are collinear. Each second reference point corresponds to one of the first reference points, and the second reference point is on a line connecting the corresponding first reference point and the origin.

In some embodiments, the method further includes capturing a plurality of images, and generating a panorama by concatenating the plurality of images. Each image corresponds to one of the set of the first reference points.

In some embodiments, the third reference point, the second reference point, and the corresponding first reference point are collinear, when the third reference point, the second reference point, and the corresponding first reference point are overlapping on a display screen of the imaging device.

In some embodiments, a first distance is between each of the first reference points and the origin, and a second distance is between each of the second reference points and the origin.

In some embodiments, the set of the first reference points comprises a first subset of the first reference points and a second subset of the first reference points. The first subset of the first reference points are on a first plane, and the second subset of the first reference points are on a second plane.

In some embodiments, the number of the first reference points in the first plane is the same as the number of the first reference points in the second plane.

In some embodiments, the number of the first reference points in the first plane is different from the number of the first reference points in the second plane.

In some embodiments, each first reference point in the first plane connecting to the origin defines a first pitch angle with respect to a horizontal plane, and each first reference point in the second plane connecting to the origin defines a second pitch angle with respect to the horizontal plane. A difference between the first pitch angle and the second pitch angle is less than a viewing angle of the imaging device.

According to an embodiment of the present disclosure, a method is disclose for capturing an image of a 3D space using an imaging device. The method includes determining a plurality of first reference points with respect to the 3D space; determining a plurality of second reference points with respect to the 3D space; determining that one of the first reference points, the corresponding second reference point and an optical center of the imaging device are collinear; and capturing the image of the 3D space in response to the determination of the collinearity. Each of the second reference points corresponds to a first reference point.

In some embodiments, the method further includes moving the imaging device to a first position corresponding to a first one of the first reference points; determining that the first one of the first reference points, the corresponding first one of the second reference points, and the optical center of the imaging device are collinear; moving the imaging device to a second position corresponding to a second one of the first reference points; and determining that the second one of the first reference points, the corresponding second one of the second reference points, and the optical center of the imaging device are collinear.

In some embodiments, the method further includes capturing a first image of the 3D space, when the first one of the first reference points, the corresponding first one of the second reference points, and the optical center of the imaging device are collinear; and capturing a second image of the 3D space, when the second one of the first reference points, the corresponding second one of the second reference points, and the optical center of the imaging device are collinear.

In some embodiments, the first image and the second image include at least one object in common.

In some embodiments, the plurality of the first reference points are on a spherical surface defined with respect to the optical center of the imaging device.

In some embodiments, the plurality of the first reference points include a first set of the first reference points and a second set of the first reference points. The first set of the first reference points are defined with respect to an interception between a first plane and the spherical surface, and the second set of the first reference points are defined with respect to an interception between a second plane and the spherical surface.

In some embodiments, the first plane and the second plane are parallel with each other.

In some embodiments, the method further includes moving the imaging device to a first set of positions correspond to the first set of the first reference points; and determining that one of the first set of the first reference points, the corresponding second reference point, and the optical center of the imaging device are collinear, when the imaging device is rotated to each of the first set of positions.

In some embodiments, images of the first set of images captured corresponding to two consecutive ones of the first set of positions include at least one common object.

In some embodiments, the method further includes capturing a second set of images of the 3D space, when the imaging device is moved to a second set of positions corresponding to the second set of the first reference points.

In some embodiments, the method further includes generating 3D data of the 3D space based on the first set of images and the second set of images.

According to an embodiment of the present disclosure, a non-transitory computer-readable medium is described. The non-transitory computer-readable medium has computer-executable instructions stored thereon, which, when executed by one or more processor, cause a processor to facilitate: determining a plurality of first reference points with respect to a 3D space; determining a plurality of second reference points with respect to the 3D space; determining that one of the first reference points, the corresponding second reference point, and an optical center of the imaging device are collinear; and capturing an image of the 3D space in response to the determination of the collinearity. Each of the second reference point corresponds to a first reference point.

DETAILED DESCRIPTION

Figure 1:
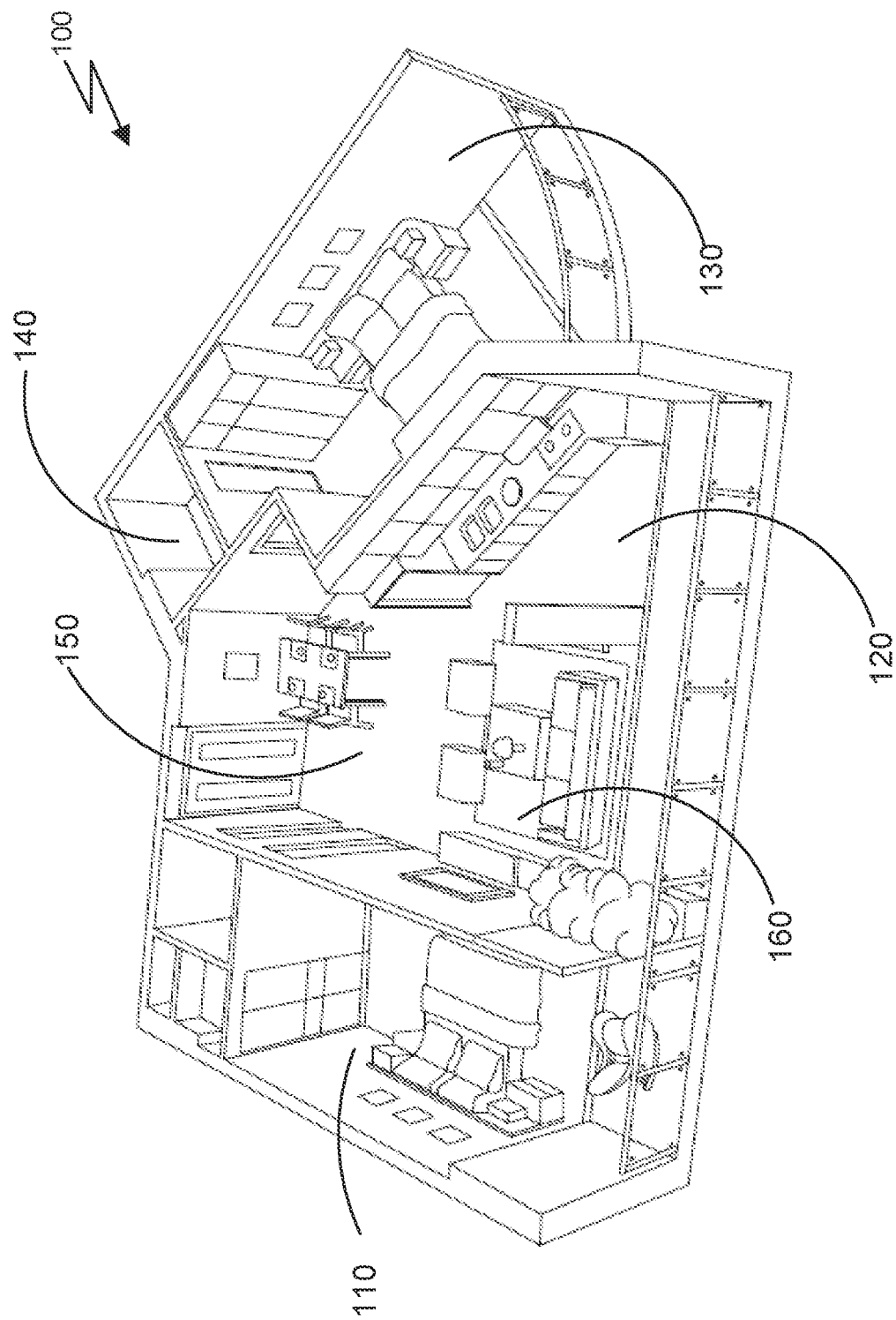
FIG. 1 illustrates an exemplary three-dimensional (3D) virtual reality (VR) environment in accordance with an embodiment.

The present disclosure described herein provides a method for capturing images of a scene using an imaging device. Parameters including the position and the orientation of the imaging device may be effectively controlled, such that a high-quality panorama may be generated based on the plurality of the images captured by the imaging device.

An optical center of the imaging device may be positioned in a region in a 3D space of the scene. Movement of the imaging device may be controlled such that the optical center of the imaging device remains within the region while acquiring a plurality of images of the 3D space. In an embodiment, the region may be a spherical region with a radius that is sufficiently small, such as 15 centimeters or smaller. The imaging device, the optical center of which is placed in the spherical region, may be considered relatively fixed at a position while taking images of the scene.

According to an additional embodiment, the orientation of the imaging device may be determined based on the parameters provided by one or more motion sensors associated with the imaging device. For example, the orientation of the imaging device may be controlled by defining a shooting angle in the 3D space of the scene. A first reference point may be defined with respect to the center of the spherical region with a predefined distance, such as 3 meters. The first reference point and the center of the spherical region may define the shooting angle. The optical center of the imaging device is placed in the spherical region, and the imaging device is oriented towards the first reference point while taking an image.

According to another embodiment, the shooting angle of the image device may be further controlled by defining a second reference point in the 3D space. The second reference point may be collinear with the first reference point and the center of the spherical region, but do not overlap with the first reference point. The optical center of the imaging device is placed in the spherical region, and the imaging device is oriented with the shooting angle defined by the first reference point and the second reference point while taking an image.

Similarly, a plurality of images may be acquired corresponding to a plurality of predefined shooting angles. The plurality of shooting angles are corresponding to a plurality of first reference points in the 3D space. A panorama of the scene may be generated based on the plurality of images. In order to improve the quality of the generated panorama, the two adjacent first reference points may be defined such that images taken corresponding to the adjacent first reference points include at least one object in common. At least two advantages are provided by overlapping the two images corresponding to adjacent first reference points: (1) to prevent voids or holes in a panorama; (2) to help with aligning the images for generating the panorama.

By applying the foregoing conditions described herein, the imaging device may be controlled to take a plurality of images sequentially. The plurality of images may be combined to generate a panorama of the scene. A simulated 3D VR environment may be generated based on the panorama of the scene.

FIG. 1 illustrates an exemplary 3D VR environment 100, in accordance with some embodiments. As shown in FIG. 1, 3D VR environment 100 may simulate or represent a residential unit, such as an apartment or house floor. It is noted that 3D VR environment 100 may include a VR representation of any in-door space or environment. Referring to FIG. 1, 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, functional space 110 may correspond to a first bedroom, and functional space 130 may correspond to a second bedroom. In some cases, a functional space may correspond to an enclosed or partially enclosed space within or adjacent to a room. For example, functional space 140 may correspond to a closet. In some cases, a function space may correspond to an area that is generally used for a specific purpose. For example, functional space 120 may correspond to a kitchen area, functional space 150 may correspond to a dining area, and functional space 160 may correspond to a living room. Although functional spaces 120, 150, and 160 may share the same room (e.g., an enclosed area), they may be considered as different functional spaces due to their different functions.

Figure 2:
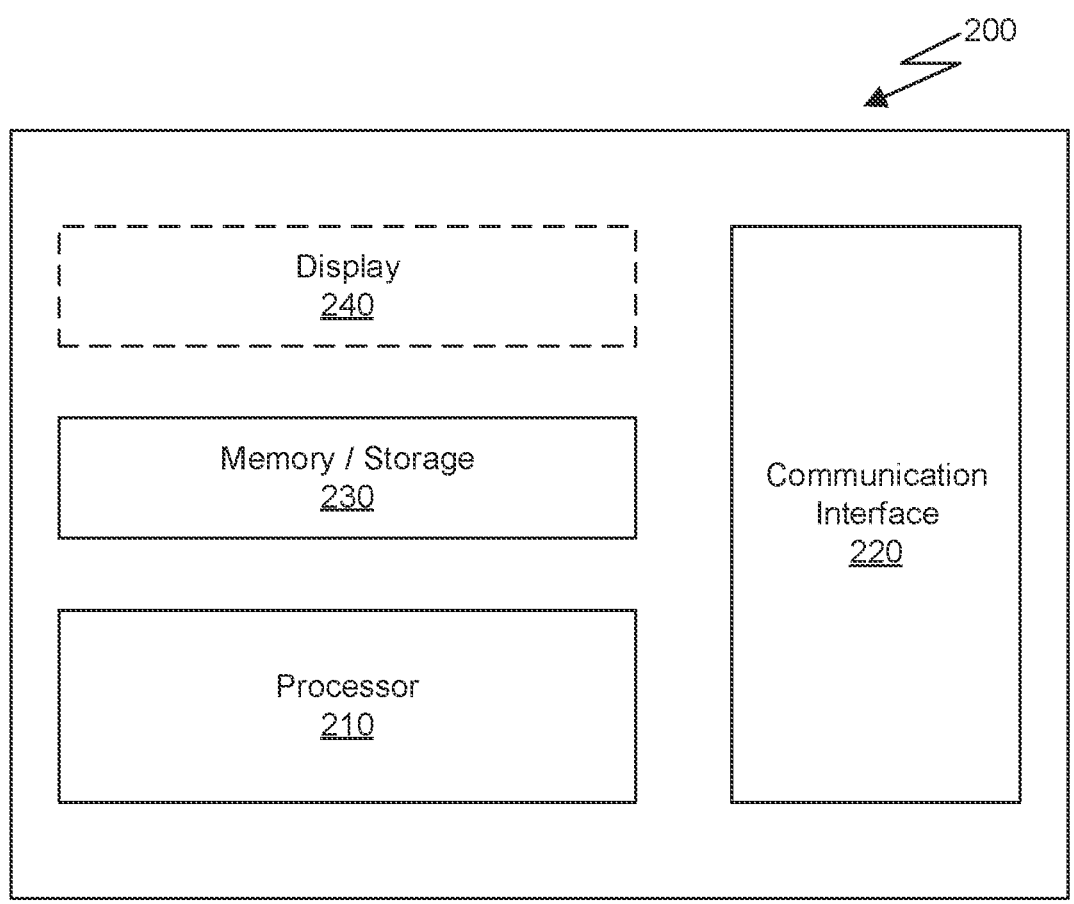
FIG. 2 illustrates a block diagram of an exemplary computer system in accordance with an embodiment.

FIG. 2 illustrates a block diagram of an exemplary computer system 200 configured to implement various functions disclosed herein. For example, computer system 200 may be configured as a server to create or reconstruct VR environment 100. In another example, computer system 200 may be configured as terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

Processor 210 may be configured to perform the operations in accordance with the instructions stored in memory 230. Processor 210 may include any appropriate type of general-purpose or special-purpose microprocessor, digital signal processor, microcontroller, or the like. Processor 210 may be configured as a separate processor module dedicated to performing one or more specific operations disclosed herein. Alternatively, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a keyboard, a mouse, a touchpad, a touch screen, a microphone, a camera, a biosensor, etc. A user may input data to terminal a device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3:
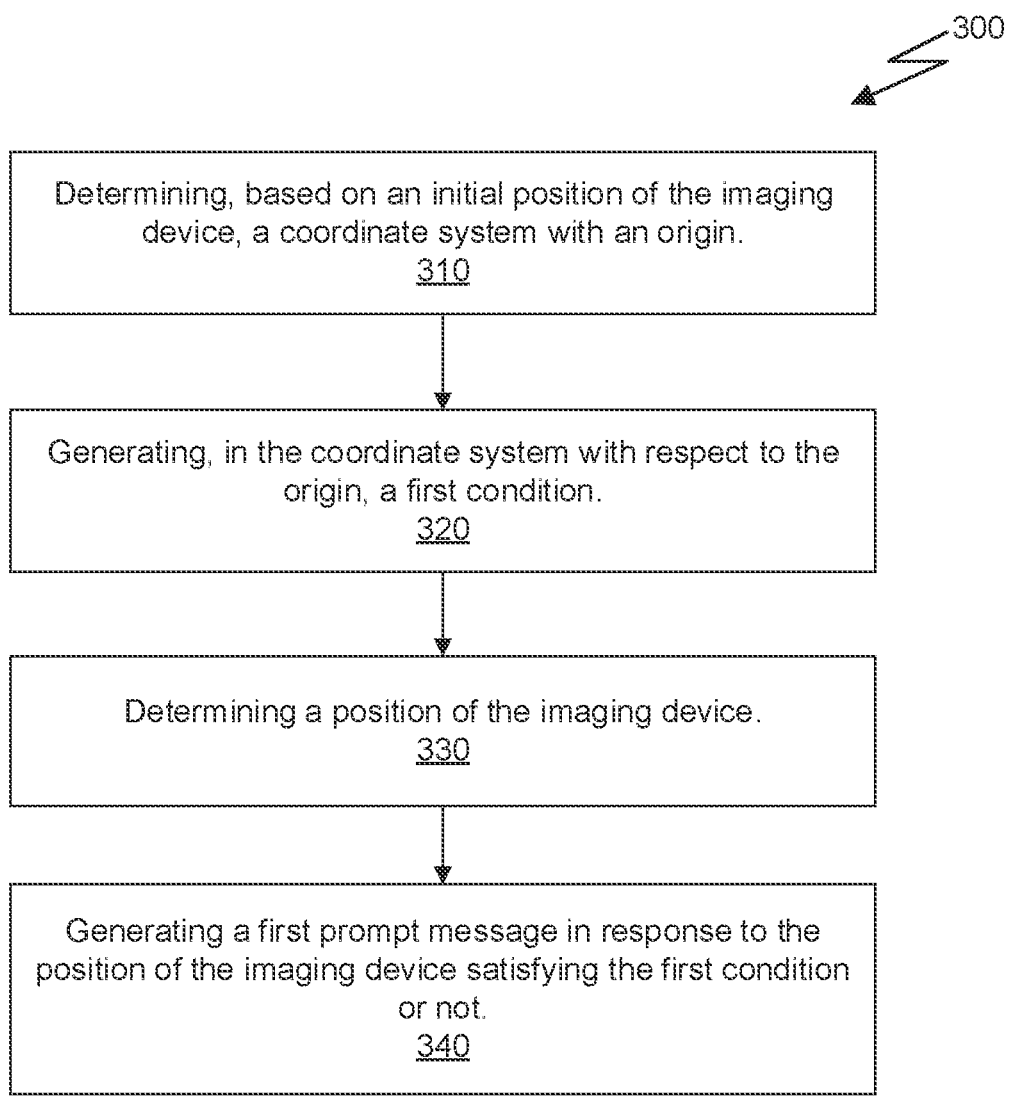
FIG. 3 illustrates a process for positioning an imaging device to take images of a scene in accordance with an embodiment.

FIG. 3 illustrates a process 300 for controlling an imaging device for acquiring an image of a scene in accordance with an embodiment. The imaging device may be an electronic device with a camera module, such as a smartphone, a tablet, and a laptop. Alternatively, the imaging device may be a camera connected with an electronic device, such as a digital camera communicating with a computer or other mobile devices through a wired or wireless connection. Process 300 may be implemented by device 200 according to the computer-executable instructions stored in memory 230. Of course, it will be appreciated that any system or device capable of carrying out the steps of process 300 is contemplated as being within the scope of the present disclosure.

The imaging device may have one or more augmented reality (AR) applications stored thereon. The AR application may provide an Application Programming Interface (API) to render a virtual 3D space of the scene. In an embodiment, the AR application may be developed or deployed based on platforms known in the art, such as ARKit in an iPhone operation system (iOS) or ARCore in an Android system. On an AR platform, an AR experience may be controlled by using an object available on the AR platform, such as an ARSession object of ARKit in iOS. The ARSession object coordinates processes including reading data from a device's motion sensor, controlling the device's built-in camera, and performing image analysis on captured camera images. As such, by tracking changes corresponding to movements of the imaging device using the ARSession object, the imaging device may obtain a pose matrix and determine the position and the orientation of the imaging device. The pose matrix may be a 4×4 matrix output from the motion sensor, which may include a 3×3 rotation matrix and a translation vector as known in the art.

At step 310, a coordinate system with an origin is determined based on an initial position of the imaging device. The coordinate system with the origin may be associated with a 3D space of the scene. The initial position of the imaging device may be derived from a pose matrix output from the motion sensor associated with the imaging device. The motion sensor may be integrated in the imaging device itself or attached to the imaging device to track the movement of the imaging device. The origin of the coordinate system may be set to the optical center of the imaging device at the initial position. Alternatively, a different origin may be selected by the user from an arbitrary point in the coordinate system.

At step 320, a first condition is generated in the coordinate system with respect to the origin of the coordinate system. The first condition may be defined as a 3D region in the scene to control the position of the imaging device. The imaging device is considered to be fixed as long as the optical center of the imaging device is inside the 3D region. The 3D region corresponding to the first condition may be presented in the field of view of the imaging device to the user.

Figure 4:
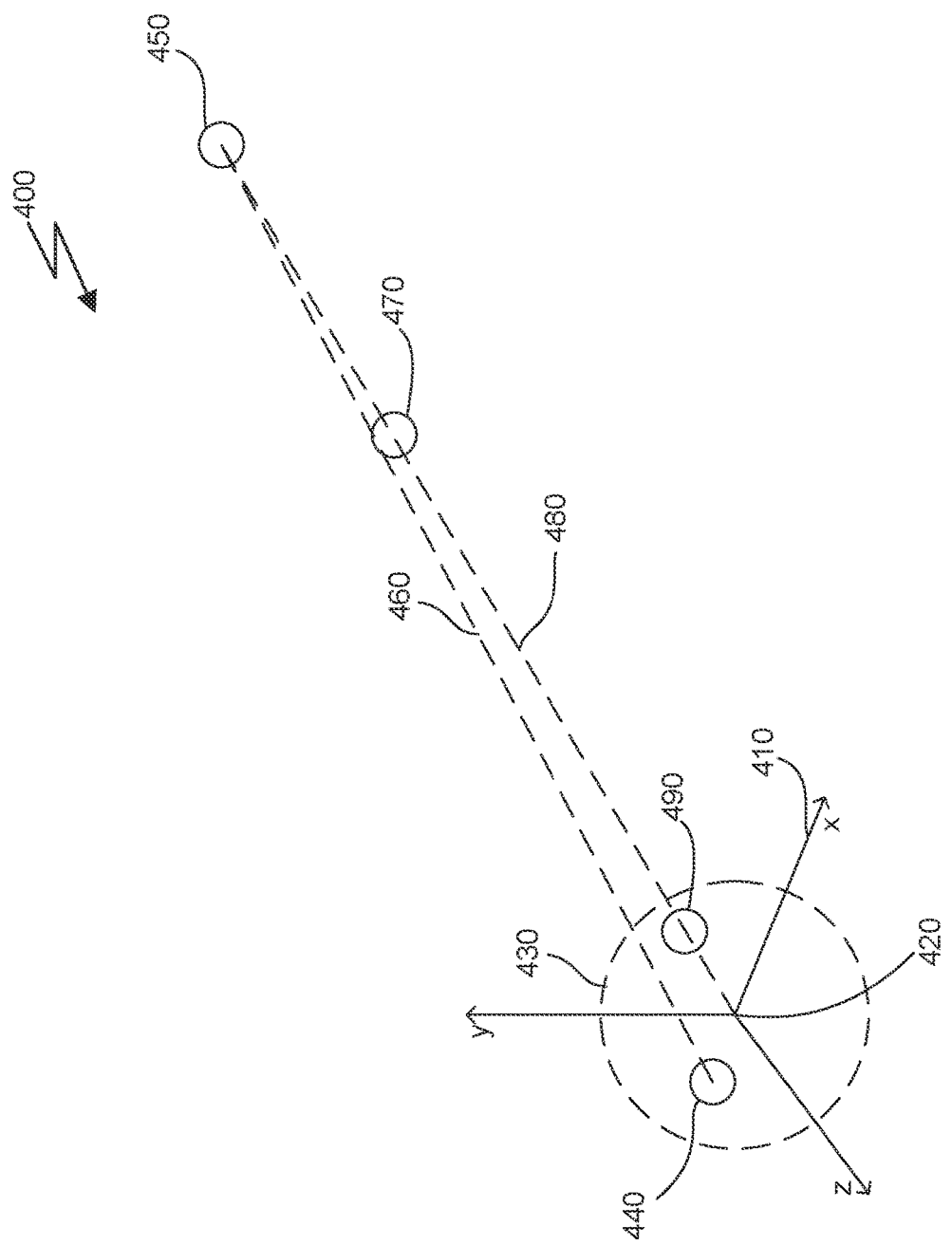
FIG. 4 illustrates conditions defined in a 3D space for controlling an imaging device in accordance with an embodiment.

In an embodiment, the 3D region corresponding to the first condition may be a spherical region 430 with a first radius in a 3D space 400, as illustrated in FIG. 4. The center of spherical region 430 may be defined as an origin 420 of a coordinate system 410. The first radius defines the maximum displacement of the imaging device while acquiring images so that the imaging device may be considered fixed. For example, the imaging device may be placed at origin 420, at position 440, or at position 490 in spherical region 430. Any position inside spherical region 430 is treated as approximately the same as origin 420 for acquiring images. The first radius of spherical region 430 may be adjusted to a second radius to adapt to scenes with different geographical characteristics. For example, when the imaging device is used to take images of a relatively small space, such as a kitchen or a bedroom, the radius of spherical region 430 may be reduced. In other words, the imaging device may be confined in a smaller space while acquiring images. When the imaging device is used to take images of a relatively large space, such as a shopping mall or a stadium, the radius of spherical region 430 may be increased. In other words, larger displacements of the imaging device are tolerated while acquiring images. The adjustment of the radius of spherical region 430 may be performed automatically based on an automatic detection program running on the imaging device or devices connected to the imaging device. Alternatively, the user may manually adjust the radius of spherical region 430 corresponding to the first condition.

Additionally, a second condition may be generated in the coordinate system with respect to the origin. The second condition may control the orientation of the imaging device. The orientation of the imaging device may include a pitch angle, a yaw angle, and/or a roll angle.

In an embodiment, the second condition may be defined as a pitch angle, a yaw angle, and/or a roll angle of the imaging device. The second condition may be compared with the current orientation of the imaging device based on the parameters output from the motion sensor.

In another embodiment, the second condition may be defined as a shooting angle with respect to origin 420 in 3D space 400. As depicted in FIG. 4, a first reference point 450 is defined in 3D space 400. The defined shooting angle is corresponding to line 480, which connects first reference point 450 and origin 420. The optical center of the imaging device is placed in spherical region 430, and the imaging device is oriented towards first reference point 450 while acquiring an image. When the optical center of the imaging device is placed at a position (such as position 440) that is not on the line defined by first reference point 450 and origin 420, the imaging device may have an actual shooting angle that is slightly different from the defined shooting angle. The actual shooting angle is corresponding to line 460 which connects position 440 and first reference point 450. When first reference point 450 is far away from origin 420 and the radius of spherical region 430 is sufficiently small, line 460 may be sufficiently close to line 480.

In a further embodiment, the shooting angle of the imaging device may be more effectively controlled by defining a second reference point 470 in 3D space 400, as illustrated in FIG. 4. Second reference point 470 is collinear with first reference point 450 and origin 420. The imaging device is placed in spherical region 430 with a shooting angle corresponding to line 480 while acquiring an image. In other words, the imaging device acquires an image when first reference point 450, second reference point 470, and the optical center of the imaging device are collinear. In this way, the actual shooting angle may be the same as the defined shooting angle. Thus, the position and the orientation of the imaging device may be better controlled.

According to a further embodiment, a plurality of shooting angles may be defined by a plurality of first reference points 450 and a plurality of corresponding second reference points 470 with respect to origin 420 in 3D space 400. The plurality of first reference points 450 may be determined in 3D space 400. In an embodiment, a first reference distance may be defined between each first reference point 450 and origin 420. The position and the size of each first reference point 450 may be individually adjusted. Additionally, a second distance may be defined between each second reference point 470 and origin 420. Each second reference point 470 is corresponding to a first reference point 450. Such that second reference point 470, corresponding first reference point 450, and origin 420 are collinear. Line 480 connecting first reference point 450 and second reference point 470 defines a shooting angle. Similarly, a plurality of shooting angles may be defined in 3D space 400. The imaging device may be aligned according to the shooting angles one by one to take a plurality of images, while the optical center of the imaging device is fixed at a desired position (e.g., inside spherical region 430).

In an embodiment, a third reference point may be presented at the center of the field of view of the imaging device, and represents the optical center of the imaging device. The optical center is aligned with a defined shooting angle, when one of the first reference points 450, the corresponding second reference point 470, and the third reference point are collinear or overlap with one another when viewed through the imaging device.

Referring back to FIG. 3, at step 330, a position and an orientation of the imaging device may be determined based on data output from the motion sensor associated with the imaging device, wherein the motion sensor may track the movement of the imaging device. In an embodiment, the motion sensor outputs data in a form of a pose matrix, which may include a rotation matrix and a translation vector. The position and the orientation of the imaging device may be calculated from the pose matrix. The determined position of the imaging device may be compared with the first condition. The determined orientation of the imaging device may be compared with the second condition.

At step 340, a first prompt message may be generated in response to the position of the imaging device satisfying the first condition or not. Additionally or alternatively, the region corresponding to the first condition may be presented on the imaging device in respond to the imaging device not satisfying the first condition. The region corresponding to the first condition may not be rendered on the imaging device in respond to the imaging device satisfying the first condition. The first prompt message may notify the user to move the imaging device until the imaging device satisfies the first condition. In an embodiment, the user may be prompted to take an image when the imaging device satisfies the first condition. The first prompt message may comprise at least a text, an image, or a sound.

Additionally, a second prompt message may be generated in response to the orientation of the imaging device not satisfying the second condition. The second condition may define at least one of a pitch angle, a yaw angle, and/or a roll angle of the imaging device. Alternatively, the second condition may define at least one shooting angle in the 3D space of the scene. At step 330, the orientation of the imaging device may be determined by the pose matrix output from the motion sensor. When the imaging device satisfies the first condition, the determined orientation of the imaging device is compared with the second condition. The second prompt message may notify the user to move (e.g., rotate) the imaging device until the imaging device satisfies the second condition. When the imaging device satisfies the first condition and the second condition, the imaging device may be triggered to take an image.

Figure 5:
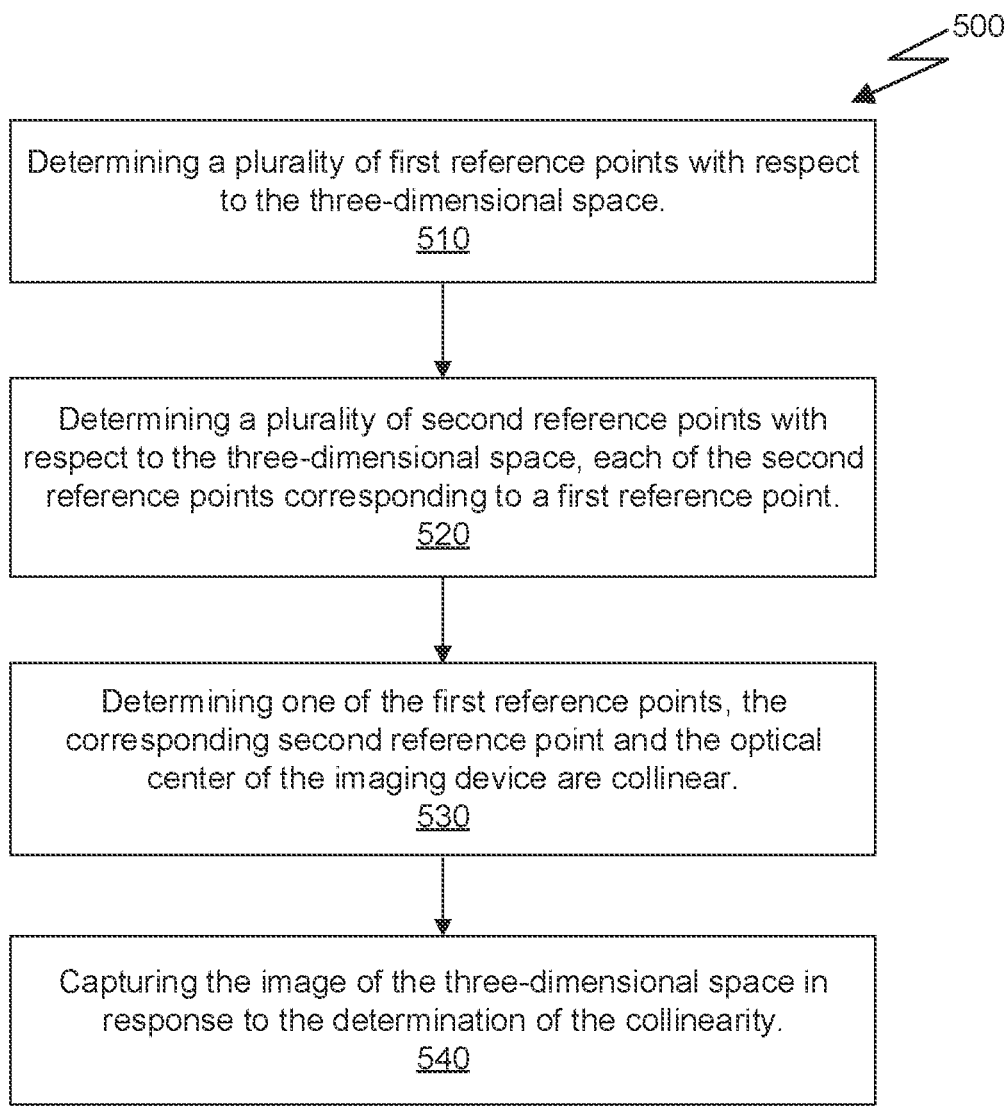
FIG. 5 illustrates a process for taking a plurality of images of a 3D space by an imaging device in accordance with an embodiment.

FIG. 5 illustrates a process 500 for acquiring a plurality of images of a 3D space by an imaging device in accordance with an embodiment. A panorama of the 3D space may be generated based on the plurality of images. Each image is taken at a defined position in the 3D space. In an embodiment, two images taken at adjacent positions may share at least one common object, which may be used to align the images to generate the panorama of the scene. Meanwhile, by taking images with overlapping areas, voids or holes may be prevented in the generated panorama. As a result, the quality of the generated panorama may be significantly improved. Process 500 may be implemented by device 200 and according to the computer-executable instructions stored in memory 230. Of course, it will be appreciated that any system or device capable of carrying out the steps of process 500 is contemplated as being within the scope of the present disclosure.

Figure 6:
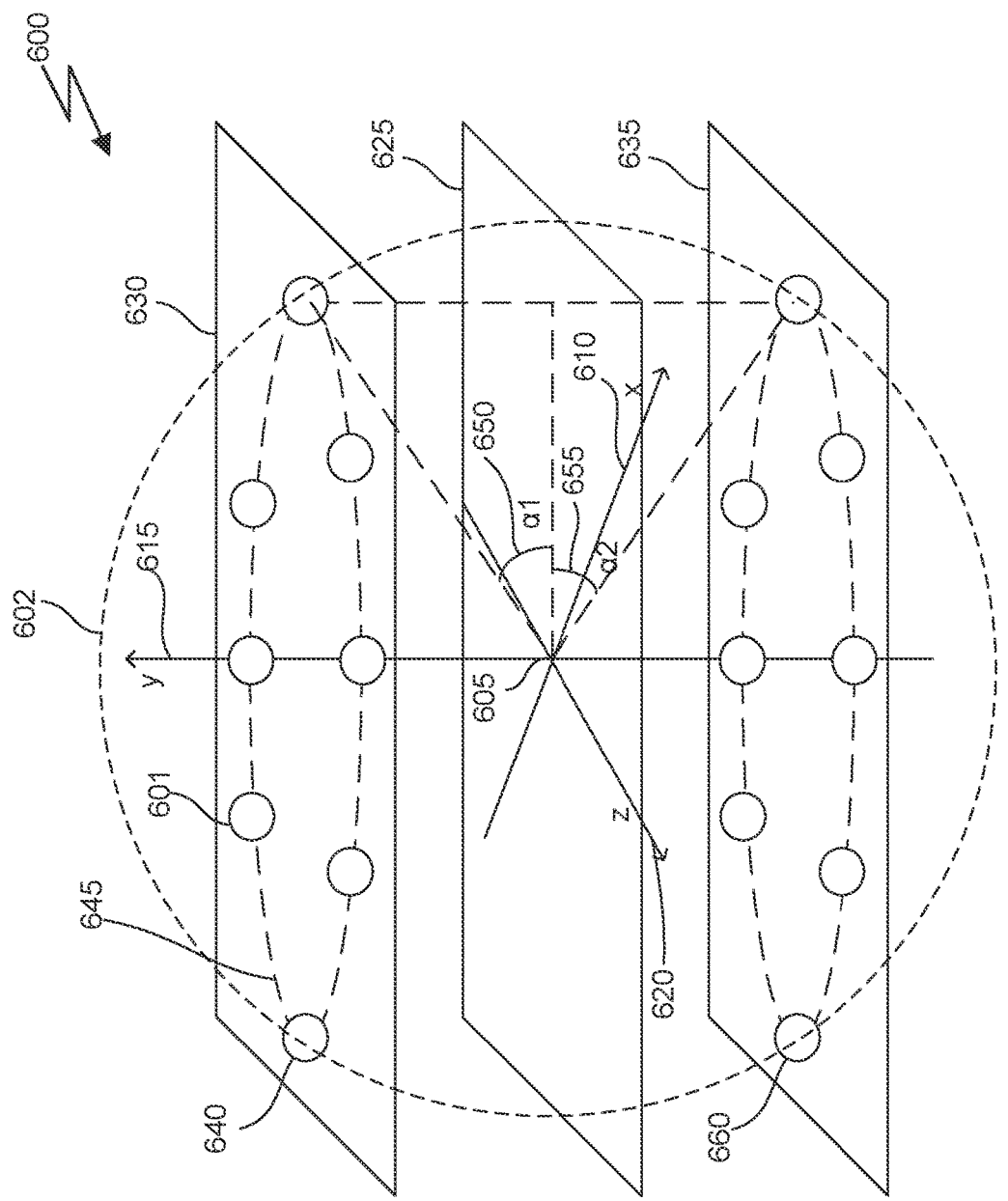
FIG. 6 illustrates a plurality of first reference points determined in a 3D space in accordance with one embodiment.

At step 510, a plurality of first reference points are determined with respect to the 3D space. In one embodiment, the first reference points may be selected from the 3D space. In an alternative embodiment, the first reference points are defined with respect to an interception between a plane (such as plane 630) and a spherical surface 602 in 3D space 600, as illustrated in FIG. 6. Spherical surface 602 is defined with a preset radius and with respect to origin 605 of a coordinate system. The preset radius is a first reference distance between each first reference point 601 and origin 605. Origin 605 may be defined as the optical center of the imaging device when the imaging device is at an initial position. The first reference points may or may not be uniformly distributed on the spherical surface. Assuming the horizontal viewing angle of the imaging device is α, the number of the first reference points N should be greater or equal to 360°/α. Such that images taken corresponding to two adjacent first reference points include an overlapping area, which may prevent voids in the generated panorama.

In an additional embodiment, the plurality of first reference points may include at least two subsets. A first subset of the plurality of first reference points correspond to a first pitch angle $\alpha_1$ 650 for the imaging device. A second subset of the plurality of first reference points correspond to a second pitch angle $\alpha_2$ 655. The difference between the first pitch angle $\alpha_1$ and the second pitch angle $\alpha_2$ may be smaller than the vertical viewing angle of the imaging device, such that an image taken corresponding to a first reference point of the first subset and an image taken corresponding to a first reference point of the second subset have at least one object in common.

FIG. 6 illustrates the plurality of first reference points including two subsets in 3D space 600 in accordance with one embodiment. 3D space 600 is defined by the coordinate system with origin 605, wherein the coordinate system has an x-axis 610, a y-axis 615, and a z-axis 620. Spherical surface 602 is defined in 3D space 600 with respect to origin 605. The radius of spherical surface 602 is a first reference distance. A plane 625 is defined, perpendicular to y-axis 615 and passing origin 605. A first subset 640 of the first reference points is defined by an interception between a first plane 630 and spherical surface 602. Thus, the first reference points in first subset 640 are distributed on a circle 645 within plane 630. The distribution of first subset 640 may or may not be uniform around circle 645. Plane 630 may be parallel to plane 625. The distance between each of the first reference points in first subset 640 and origin 605 is the first reference distance. First pitch angle $\alpha_1$ 650 is defined as an angle between plane 625 and a line from a first reference point of first subset 640 to origin 605.

Setting a fixed distance between each first reference point 601 and origin 605 simplifies the setup of the first reference points and improves computational efficiency. Similarly, setting a fixed pitch angle for the first subset of the first reference points makes it convenient for the user to take images. Alternatively, each first reference point of the first subset may be at a different distance from origin 605. Still alternatively, each first reference point of the first subset may correspond to a different pitch angle.

The number of the first reference points in first subset 640 may be greater or equal to 360°/α, where α is the horizontal viewing angle of the imaging device. Such that images taken at two adjacent first reference points in first subset 640 may include an overlapping area, which prevents voids or holes from forming in the generated panorama.

Similarly, a second subset 660 of the first reference points is defined with respect to an interception between a second plane 635 and spherical surface 602. Thus, the first reference points in second subset 660 are distributed on a circle within plane 635. The distribution of the second subset may or may not be uniform around the circle. Plane 635 may be parallel to plane 625. The distance between each first reference point in second subset 660 and origin 605 is the first reference distance (i.e., the radius of spherical surface 602). A second pitch angle $\alpha_2$ 655 is defined as an angle between plane 625 and a line from a first reference point of second subset 660 to origin 605. Similarly, the number of the first reference points in second subset 660 may be greater or equal to 360°/α, where α is the horizontal viewing angle of the imaging device.

The difference between the first pitch angle $\alpha_1$ and the second pitch angle $\alpha_2$, that is $|\alpha_1-\alpha_2|$, may be smaller than the vertical viewing angle of the imaging device. Such that an image taken corresponding to a first reference point of first subset 640 and an image taken corresponding to a first reference point of second subset 660 may have at least one object in common or partially overlap each other. Pitch angles $\alpha_1$ and $\alpha_2$ may have positive or negative signs depending on the side of plane 625 which pitch angles $\alpha_1$ and $\alpha_2$ fall on. For example, pitch angles $\alpha_1$ and $\alpha_2$ falling on the same side of plane 625 may both have the same sign (i.e., both being positive or negative). Alternatively, pitch angles $\alpha_1$ and $\alpha_2$ falling on different sides of plane 625 may have opposite signs.

It is noted that the number of the first reference points in first subset 640 and the number of the first reference points in second subset 660 may or may not be identical. In addition, plane 630 may or may not be parallel to plane 625. Similarly plane 635 may or may not be parallel to plane 630 or plane 625. Additional subsets of the first reference points may be defined in 3D space 600. For example, a third subset of the first reference points may be defined with respect to an interception between a third plane and spherical surface 602, the third subset of the first reference points corresponding to a third pitch angle. Each subset of images corresponding to a pitch angle may be used to generate a panorama corresponding to the pitch angle. Subsequently, a panorama of a larger vertical viewing angle may be generated by combining the panoramas corresponding to different pitch angles.

Referring back to FIG. 5, at step 520, a plurality of second reference points with respect to the 3D space are defined. Each of the second reference points corresponds to one of the first reference points. A second reference point may be on a line connecting a corresponding first reference point and the origin. In other words, the first reference point, the corresponding second reference point, and the origin are collinear. In one embodiment, a first reference distance is between each first reference point and the origin. A second reference distance is between each second reference point and the origin. The second distance may be smaller than the first distance.

Figure 7:
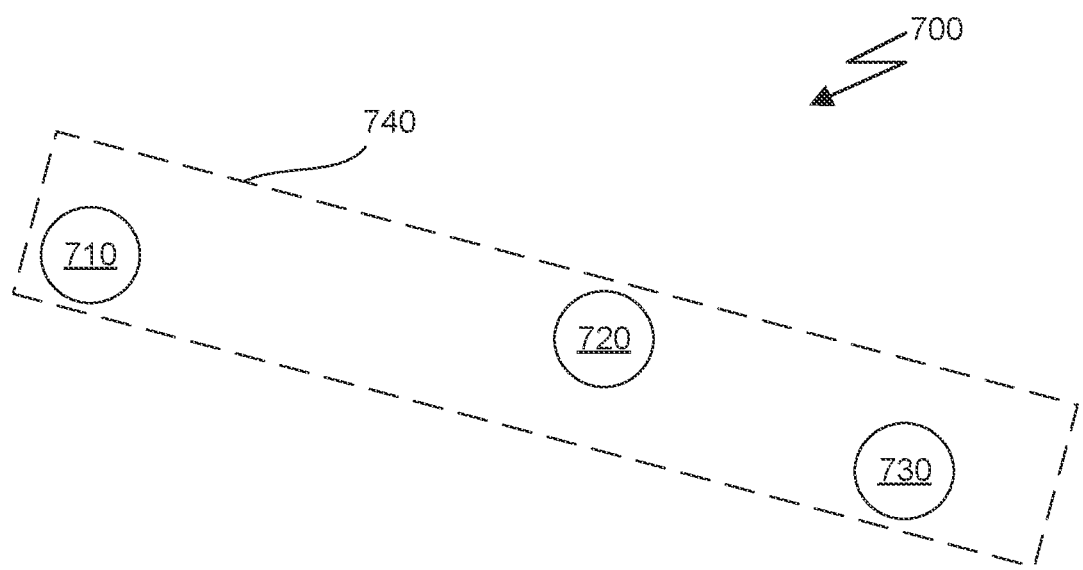
FIG. 7 illustrates an exemplary embodiment of three collinear reference points.

At step 530, a spatial relationship of one of the first reference points, the corresponding second reference point, and the optical center of the imaging device are monitored by the imaging device. The imaging device may determine whether the first reference point, the corresponding second reference point, and the optical center are collinear. FIG. 7 illustrates a collinear situation 700 of the three points above in accordance with an embodiment. A first reference point 710 and a corresponding second reference point 720 are presented on a display of the imaging device. The optical center of the imaging device is presented as a third reference point 730 on the display of the imaging device. First reference point 710 and corresponding second reference point 720 are fixed with respect to the 3D space. Third reference point 730 is fixed with respect to the imaging device. First reference point 710 and corresponding second reference point 720 determine a tolerance region 740 in the 3D space. When third reference point 730 falls in tolerance region 740, third reference point 730, first reference point 710, and corresponding second reference point 720 are considered to be collinear. The user may move the imaging device until the optical center (i.e., third reference point 730) of the imaging device is collinear with first reference point 710 and corresponding second reference point 720.

Referring back to FIG. 5, at step 540, an image of the 3D space is captured by the imaging device in response to the determination of the collinearity described above.

Figure 8:
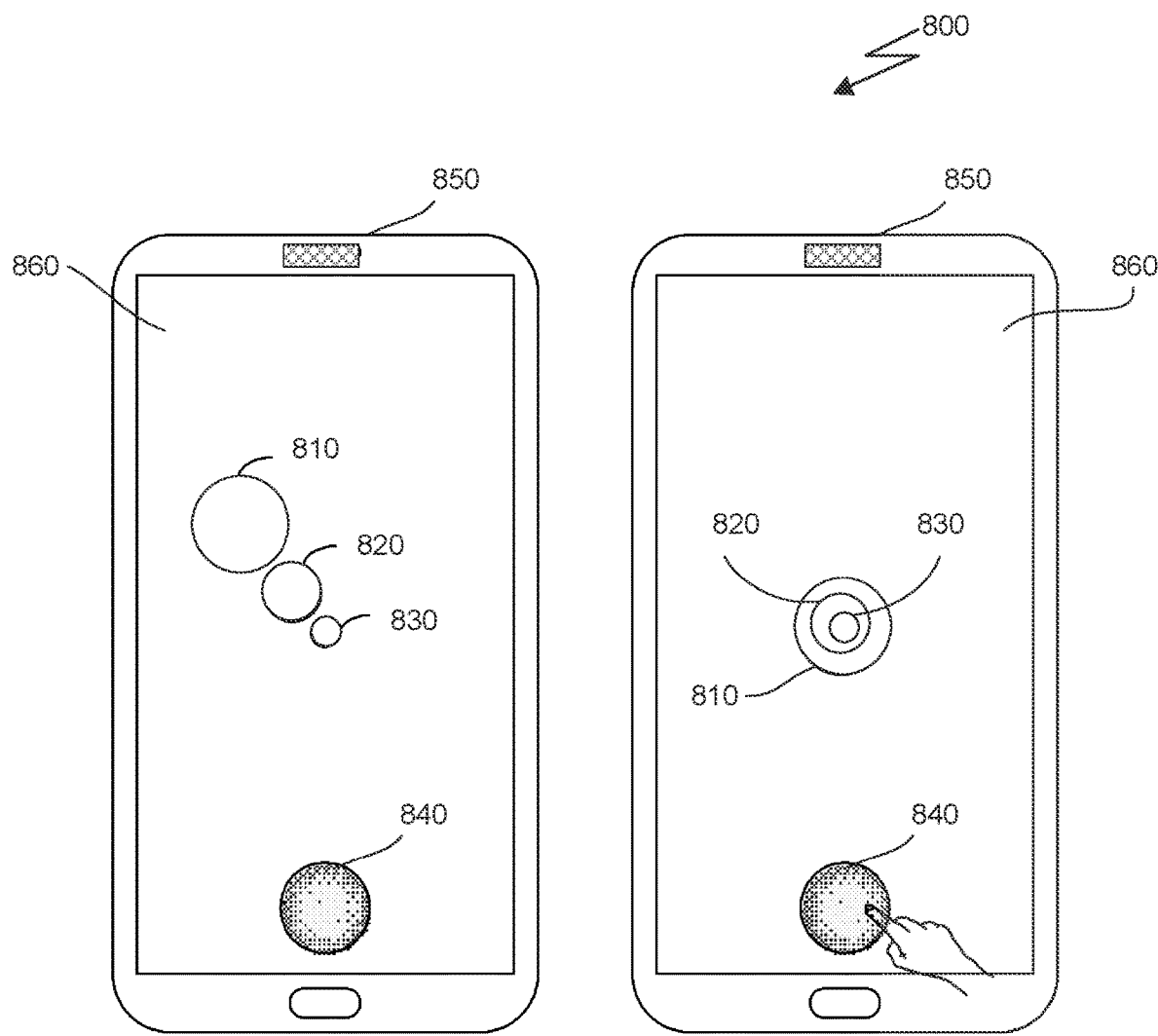
FIG. 8A illustrates an exemplary embodiment of a user interface showing three reference points.
FIG. 8B illustrates an exemplary embodiment of a user interface showing three collinear reference points.

FIGS. 8A and 8B illustrate an embodiment 800 of three reference points (e.g., a first reference point 810, a corresponding reference point 820, and a third reference point 830) presented on a display screen 860 of an imaging device 850. Imaging device 850 may be a smartphone with a camera module. The field of view of imaging device 850 is displayed on screen 860 of imaging device 850. First reference point 810, corresponding second reference point 820, and third reference point 830 may be displayed on screen 860. Third reference point 830 may represent the optical center of imaging device 850 and may be fixed at a center of screen 860 of imaging device 850. Thus, third reference point 830 does not move on screen 860 when imaging device 850 is moved.

First reference point 810 and corresponding second reference point 820 are fixed with respect to the 3D space. Therefore, when the user moves imaging device 850, first reference point 810 and corresponding second reference point 820 move on screen 860 of imaging device 850. In addition, a virtual button 840 may be displayed on screen 860. In FIG. 8A, first reference point 810, corresponding second reference point 820 and third reference point 830 are not collinear. When the user moves imaging device 850, the spatial relationship of first reference point 810, corresponding second reference point 820, and third reference point 830 may change. As illustrated in FIG. 8B, first reference point 810, corresponding second reference point 820, and third reference point 830 may overlap as viewed through screen 860. In other words, the three reference points are considered collinear in the 3D space. As a result, the optical center is aligned with a preset shooting angle determined by first reference point 810 and corresponding second reference point 820. The user may then tap virtual button 840 to take an image at the current position of imaging device 850.

It is noted that positions, sizes, colors, and shapes of the reference points displayed on screen 860 of imaging device 850 are only for purposes of illustration. Positions of the reference points on the screen may vary. Different sizes, colors, and/or shapes of the reference points may be adopted. There may be more than one first reference point and more than one second reference point displaying on screen 860 of imaging device 850. As long as the third reference point 830 overlaps with a first reference point 810 and a corresponding second reference point 820, imaging device 850 may be triggered to take an image. Furthermore, button 840 may be a real button instead of a virtual button. Still further, imaging device 850 may be automatically triggered to take an image when the collinearity occurs.

Referring back to FIG. 5, steps 510 through 540 of process 500 may be repeated for taking a plurality of images in the 3D space. The imaging device may capture a first image of the 3D space in response to the determination of the first one of the first reference points, the corresponding first one of the second reference points, and the optical center of the imaging device being collinear. Then, the imaging device may capture a second image of the 3D space in response to the determination of a second one of the first reference points, the corresponding second one of the second reference points, and the optical center of the imaging device being collinear. The first image and the second image may include at least one object in common. The steps are repeated until the imaging device captures images corresponding to all of the first reference points.

In some embodiments, there are at least two subsets of the plurality of first reference points. The user may move the imaging device to a first location having a first set of positions corresponding to a first set of the first reference points. At the first location, for each position corresponding to one of the first reference points in the first set, an image is taken in response to one of the first set of the first reference points, the corresponding second reference point, and the optical center of the imaging device being collinear. Then the imaging device is rotated to a next position of the first set of positions. In this way, the imaging device takes a first set of images corresponding to the first set of positions at the first location. The images captured corresponding to two adjacent ones of the first set of positions may include at least one object in common.

The user may then move the imaging device to a second location having a second set of positions corresponding to the second set of the first reference points to take a second set of images. The steps are repeated until the user takes images corresponding to all positions corresponding to the first reference points. A panorama of the 3D space may be generated based on the first set of images corresponding to the first set of positions and the second set of images corresponding to the second set of positions. Subsequently, 3D data may be generated based on the panorama.

Figure 9:
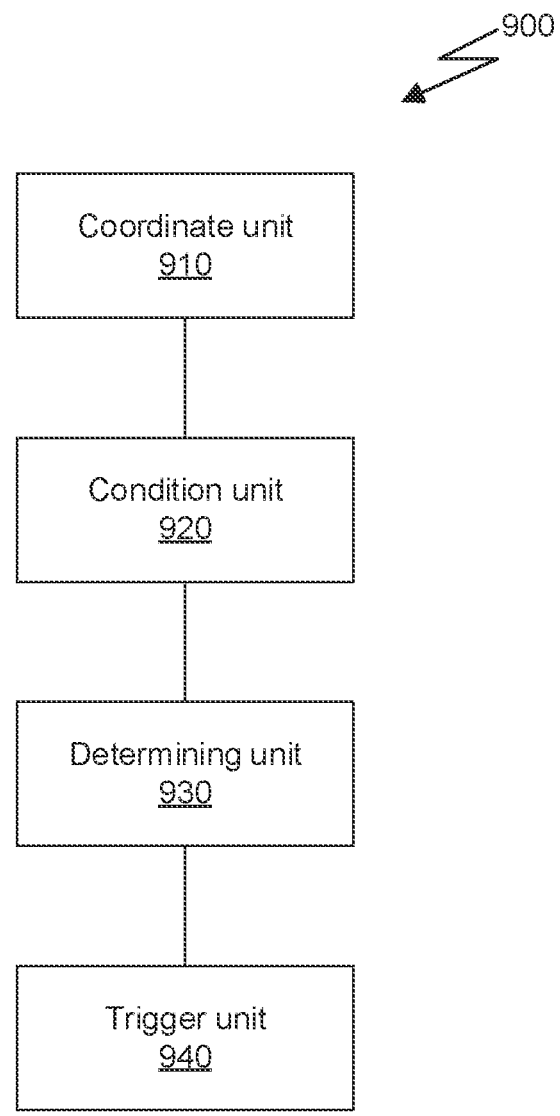
FIG. 9 illustrates an apparatus for positioning an imaging device to take images of a scene in accordance with an embodiment.

The foregoing disclosed processes may also be carried on by an electronic device 900 as illustrated in FIG. 9 in accordance with an embodiment. Device 900 may comprise a coordinate unit 910, a condition unit 920, a determining unit 930, and a trigger unit 940, which may be implemented by computer-executable instructions stored in, for example, memory 230 and executed by processor 210 described above with respect to FIG. 2.

Coordinate unit 910 may be configured to establish a coordinate system in a 3D space of the scene. The coordinate system may be generated based on an initial position of an imaging device, which may or may not be part of device 900. The initial position of the imaging device may be calculated by data output from a motion sensor associated with the imaging device. For example, the motion sensor may be a three-axis accelerometer and/or a gyroscope. The motion sensor may be integrated in the imaging device itself or attached to the imaging device to track the movement of the imaging device.

Additionally, coordinate unit 910 may determine an origin of the coordinate system. An arbitrary point in the coordinate system may be selected as the origin. For example, the optical center of the imaging device at the initial position may be preset as a default origin. The user may select another point in the 3D space to be the origin.

Condition unit 920 may determine, based on the coordinate system and the corresponding origin, a first condition with respect to the origin in the 3D space. The first condition may define at least one position in the 3D space to place the imaging device for acquiring an image.

The first condition may be a region defined in the scene. For example, the user may be presented with a spherical region with a predefined radius in the field of view of the imaging device. When the user moves the imaging device, the optical center of the imaging device may move in or out of the spherical region in the 3D space. The region outside of the spherical region may be rendered as a shadowed region such that the user is guided to maintain the optical center of the imaging device inside the spherical region. In an embodiment, the spherical region may be presented on the imaging device when the imaging device is out of the spherical region. The spherical region may not be rendered when the imaging device is in the spherical region. The size and position of the region corresponding to the first condition may be adjustable. In an embodiment, the predefined radius of the spherical region may be adjusted manually by the user or automatically based on geographical characteristics of the scene.

Additionally, condition unit 920 may determine a second condition to further control the orientation of the imaging device. In an embodiment, the second condition controls at least one of a pitch angle, a yaw angle, or a roll angle of the imaging device. The second condition may define a tolerant range for at least one of the angles for the imaging device. For example, the imaging device may be positioned to be perpendicular to a horizontal direction with a predefined tolerance while taking images of the scene. The user may be notified when the imaging device is not properly positioned.

Alternatively, the second condition may be a predefined shooting angle with respect to origin 420 in 3D space 400, as illustrated in FIG. 4 in accordance with an embodiment. Condition unit 920 may generate a first reference point 450 with respect to origin 420 in 3D space 400. The defined shooting angle is corresponding to a line 480, which connects first reference point 450 and origin 420. The imaging device may be placed in a spherical region 430 and oriented towards first reference point 450 while acquiring an image. When the imaging device is placed at a position (such as point 440) that is not on line 480 defined by first reference point 450 and origin 420, the imaging device may have an actual shooting angle that is slightly different from the defined shooting angle. In this example, the actual shooting angle may correspond to line 460, which connects point 440 and first reference point 450. When first reference point 450 is far away from origin 420 and radius of spherical region 430 is sufficiently small, line 460 may be sufficiently close to line 480.

Optionally, condition unit 920 may further define a second reference point 470 in 3D space 400, as illustrated in FIG. 4, to control the shooting angle of the imaging device. Condition unit 920 may generate second reference point 470, which is collinear with first reference point 450 and origin 420. The imaging device may be placed in spherical region 430 with the shooting angle corresponding to line 480 while acquiring an image. In other words, the imaging device acquires an image when first reference point 450, second reference point 470, and the optical center of the imaging device (such as point 490) are collinear. In this way, the actual shooting angle may be the same as the defined shooting angle. Thus, the position and the orientation of the imaging device may be better controlled.

According to a further embodiment, condition unit 920 may define a plurality of shooting angles by generating a plurality of first reference points 450 and optionally a plurality of corresponding second reference points 470 with respect to origin 420 in 3D space 400. The plurality of first reference points 450 may be placed in 3D space 400. In an embodiment, a first reference distance may be defined between each first reference point 450 and origin 420. The position and the size of each first reference point 450 may be individually adjusted. Additionally, a second distance may be defined between each second reference point 470 and origin 420. Each second reference point 470 is corresponding to a first reference point 450, such that each second reference point 470, corresponding first reference point 450, and origin 420 are collinear. Line 480 connecting first reference point 450 and second reference point 470 defines a shooting angle. Similarly, the plurality of the shooting angles are defined in 3D space 400. The imaging device may be aligned according to the shooting angles defined above, while the optical center of the imaging device is fixed at a desired position (e.g., inside spherical region 430).

Referring back to FIG. 9, determining unit 930 may be configured to determine the position and the orientation of the imaging device. The position and the orientation of the imaging device may be calculated by data output from a motion sensor. In an embodiment, the motion sensor may output a 4×4 pose matrix, which represents the position and the orientation of the imaging device. The pose matrix may include a 3×3 rotation matrix and a translation vector as known in the art. Thus, the position and the orientation of the imaging device may be derived from the pose matrix. The determined position and the orientation of the imaging device may be compared with the conditions preset by condition unit 920. Subsequently, one or more operations may be determined by trigger unit 940 in response to the comparison results from determining unit 930.

Trigger unit 940 may generate a first prompt message in response to the imaging device satisfying the first condition or not. Furthermore, trigger unit 940 may generate a second prompt message in response to the orientation of the imaging device satisfying the second condition or not. Each of the first prompt message and the second prompt message may comprise at least one of a text, an image, or a sound. Still further, when the imaging device satisfies the condition(s) preset by condition unit 920, trigger unit 940 may trigger the imaging device to take at least one image of the scene. Alternatively, the trigger unit 940 may notify the user to take an image manually.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for capturing an image of a scene using an imaging device, comprising:

determining, based on an initial position of the imaging device, a coordinate system with an origin in a three-dimensional (3D) space of the scene;

generating, in the coordinate system with respect to the origin, a first condition to control the position of the imaging device in the 3D space;

generating a second condition to control the orientation of the imaging device;

determining a position and an orientation of the imaging device;

generating a first prompt message in response to the position of the imaging device satisfying the first condition; and generating a second prompt message in response to the orientation of the imaging device satisfying the second condition.

2. The method according to claim 1, wherein the first condition is defined as a spherical region with a first radius in the 3D space, the method further comprising:
displaying the spherical region with the first radius, in response to the position of the imaging device being out of the spherical region; and
hiding the spherical region with the first radius, in response to the position of the imaging device being in the spherical region.

3. The method according to claim 2, further comprising:
receiving a request for changing the first radius to a second radius; and
adjusting the first radius to the second radius for the spherical region.

4. The method according to claim 1,
wherein the orientation of the imaging device comprises at least one of a pitch angle, a yaw angle, or a roll angle; and
wherein the second condition comprises a tolerance range for at least one of the pitch angle, the yaw angle, or the roll angle.

5. The method according to claim 1, wherein generating the second condition further comprises:
generating, based on the coordinate system and the origin, a set of first reference points in the 3D space;
generating a set of second reference points, wherein each second reference point corresponds to one of the first reference points, wherein the second reference point is on a line connecting the corresponding first reference point and the origin;
generating, a third reference point corresponding to an optical center of the imaging device; and
capturing the image, in response to the third reference point, the second reference point and the corresponding first reference point being collinear.

6. The method according to claim 5, further comprising:
capturing a plurality of images, wherein each image corresponds to one of the set of the first reference points; and
generating a panorama by concatenating the plurality of images.

7. The method according to claim 5, wherein the third reference point, the second reference point, and the corresponding first reference point are collinear, when the third reference point, the second reference point, and the corresponding first reference point are overlapping on a display screen of the imaging device.

8. The method according to claim 5, wherein a first distance is between each of the first reference points and the origin; and
wherein a second distance is between each of the second reference points and the origin.

9. The method according to claim 5, wherein the set of the first reference points comprises a first subset of the first reference points and a second subset of the first reference points;
wherein the first subset of the first reference points are on a first plane; and
wherein the second subset of the first reference points are on a second plane.

10. The method according to claim 9, wherein the number of the first reference points in the first plane is the same as the number of the first reference points in the second plane.

11. The method according to claim 9, wherein the number of the first reference points in the first plane is different from the number of the first reference points in the second plane.

12. The method according to claim 9, wherein each first reference point in the first plane connecting to the origin defines a first pitch angle with respect to a horizontal plane,
wherein each first reference point in the second plane connecting to the origin defines a second pitch angle with respect to the horizontal plane, and
wherein a difference between the first pitch angle and the second pitch angle is less than a viewing angle of the imaging device.

13. A method for capturing an image of a three-dimensional (3D) space using an imaging device, comprising:
determining a plurality of first reference points with respect to the 3D space;
determining a plurality of second reference points with respect to the 3D space, each of the second reference points corresponding to a first reference point;
determining that one of the first reference points, the corresponding second reference point and an optical center of the imaging device are collinear; and
capturing the image of the 3D space in response to the determination of the collinearity.

14. The method of claim 13, wherein the determining of one of the first reference points, the corresponding second reference point, and the optical center of the imaging device are collinear further comprising:
moving the imaging device to a first position corresponding to a first one of the first reference points;
determining that the first one of the first reference points, the corresponding first one of the second reference points, and the optical center of the imaging device are collinear;
moving the imaging device to a second position corresponding to a second one of the first reference points; and
determining that the second one of the first reference points, the corresponding second one of the second reference points, and the optical center of the imaging device are collinear.

15. The method of claim 14, wherein the capturing of the image of the 3D space further comprises:
capturing a first image of the 3D space in response to the determination of the first one of the first reference points, the corresponding first one of the second reference points, and the optical center of the imaging device are collinear; and
capturing a second image of the 3D space in response to the determination of the second one of the first reference points, the corresponding second one of the second reference points, and the optical center of the imaging device are collinear.

16. The method of claim 15, wherein the first image and the second image include at least one object in common.

17. The method of claim 13, wherein the plurality of the first reference points are on a spherical surface defined with respect to the optical center of the imaging device.

18. The method of claim 17, wherein the plurality of the first reference points include:
a first set of the first reference points defined with respect to an interception between a first plane and the spherical surface, and
a second set of the first reference points defined with respect to an interception between a second plane and the spherical surface.

19. The method of claim 18, wherein the first plane and the second plane are parallel with each other.

20. The method of claim 18, wherein the determining of one of the first reference points, the corresponding second reference point, and the optical center of the imaging device are collinear further comprises:
moving the imaging device to a first set of positions correspond to the first set of the first reference points; and
determining that one of the first set of the first reference points, the corresponding second reference point, and the optical center of the imaging device are collinear when the imaging device is rotated to each of the first set of positions.

21. The method of claim 20, wherein the capturing of the image of the 3D space in response to the determination of the collinearity further comprises:
capturing a first set of images of the 3D space when the imaging device is moved to the first set of positions.

22. The method of claim 21, wherein images of the first set of images captured corresponding to two consecutive ones of the first set of positions include at least one common object.

23. The method of claim 21, the capturing of the image of the 3D space in response to the determination of the collinearity further comprises:
capturing a second set of images of the 3D space when the imaging device is moved to a second set of positions corresponding to the second set of the first reference points.

24. The method of claim 23, further comprising generating 3D data of the 3D space based on the first set of images and the second set of images.

25. The non-transitory computer-readable medium, having computer-executable instructions stored thereon, the computer-executable instructions, when executed by one or more processors, cause a processor to facilitate:
determining a plurality of first reference points with respect to a three-dimensional (3D) space;
determining a plurality of second reference points with respect to the 3D space, each of the second reference points corresponding to a first reference point;
determining that one of the first reference points, the corresponding second reference point, and an optical center of the imaging device are collinear; and
capturing an image of the 3D space in response to the determination of the collinearity.

* * * * *